(12) United States Patent
Ziavras et al.

(10) Patent No.: US 7,097,127 B2
(45) Date of Patent: Aug. 29, 2006

(54) MASS TRIM MECHANISM

(75) Inventors: John Ziavras, Hermosa Beach, CA (US); Randy A. Kasperson, Palmdale, CA (US)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 10/602,571

(22) Filed: Jun. 24, 2003

(65) Prior Publication Data

US 2004/0262440 A1 Dec. 30, 2004

(51) Int. Cl.
*B65H 75/48* (2006.01)
*B64G 1/24* (2006.01)

(52) U.S. Cl. ................ 242/371; 242/538.2; 244/158 R

(58) Field of Classification Search ................ 242/371, 242/373, 538, 538.2; 244/93, 170, 164
See application file for complete search history.

(56) References Cited

U.S. PATENT DOCUMENTS

| | | | |
|---|---|---|---|
| 2,063,799 A * | 12/1936 | Fornelius et al. ............. | 185/37 |
| 2,375,459 A * | 5/1945 | Ballou ..................... | 242/422.4 |
| 3,033,316 A * | 5/1962 | Foster .......................... | 185/37 |
| 3,151,704 A * | 10/1964 | Clarke .......................... | 185/37 |
| 3,175,780 A * | 3/1965 | Nettles ........................ | 242/539 |
| 3,785,590 A | 1/1974 | Wentworth | |
| 4,253,620 A * | 3/1981 | Takei et al. .................. | 242/373 |
| 4,719,992 A * | 1/1988 | Elward et al. ................ | 185/43 |
| 5,104,056 A | 4/1992 | Jannotta et al. | |
| 5,386,884 A * | 2/1995 | Chisholm ..................... | 185/39 |
| 5,597,141 A * | 1/1997 | Storaasli ..................... | 244/164 |
| 5,716,031 A * | 2/1998 | Duchon ....................... | 244/164 |
| 6,173,922 B1* | 1/2001 | Hoyt et al. .................. | 244/172 |

OTHER PUBLICATIONS

STS-103: Solid-state recorder [online].☐☐www.chron.com/content/ineractive/space/missions/sts-103/eva/recorder.html.*

F.A. Votta, Jr., "The Theory and Design of Long-Deflection Constant-Force Spring Elements," Transactions of the ASME, 1952, pp. 439-450.

Boeing To Build Next-Generation Weather Instrument Under Potential $300 Million Contract [online], [retrieved on Nov. 19, 2002]. Retrieved from the Internet http:www.boeing.com/news/releases/2001/q3/nr_010731s.ht.

* cited by examiner

*Primary Examiner*—Kathy Matecki
*Assistant Examiner*—Sang Kim
(74) *Attorney, Agent, or Firm*—Gates & Cooper LLP

(57) ABSTRACT

The invention discloses an apparatus and method for adjusting the position of the center of mass of a mechanical structure. A typical apparatus includes a storage spool, an output spool and a flexible material having a first end coupled to the storage spool and a second end coupled to the output spool. The flexible material has a length distributed between windings of the storage spool and the output spool to adjust mass properties of an attached structure.

30 Claims, 18 Drawing Sheets

MASS TRIM MECHANISM

BACKGROUND OF THE INVENTION

1. Field of the Invention

The present invention relates to systems and methods for statically and dynamically balancing a mechanical structure. Particularly, the present invention relates to such systems and methods for space applications.

2. Description of the Related Art

Mass trim mechanisms are used to remove imbalance in a mechanical structure such as a spinning spacecraft, sensor, or other payload. Such imbalances can create disturbance torques that cause pointing errors in the highly sensitive antennas and other instruments on a spacecraft. Typically the spacecraft or payload is nominally balanced on the ground using balance weights. Imbalances evident on orbit and not removed during ground processing are referred to as "residual imbalances". These residual imbalances can result from various sources including outgassing, 1-G sag (the effect of going from a 1-G build environment to a zero-G operational environment), balancing process uncertainty and deployment repeatability errors.

Consequently, residual static and dynamic imbalances are typically reduced or eliminated during on-orbit testing using mass trim mechanisms. Mass trim mechanisms can be used to adjust mass properties in order to correct both static imbalances, adjusting the center of gravity (CG), and dynamic imbalances, adjusting the products of inertia (POI). Balance corrections can also be made throughout the spacecraft life. For example, such adjustments can be necessary as mass properties of the spacecraft change as fuel is expended.

Thus, mass trim mechanisms are employed in spacecraft whenever it is necessary to adjust the mass properties of the vehicle. The center of gravity position is important to maintaining control of the satellite on orbit. For example, a single mass trim mechanism can be used on orbiting satellites to adjust the CG position of the spacecraft or a significant payload substructure, e.g. a sensor or other payload. In addition, when used in combination with one or more other mass trim mechanisms, a mass trim mechanism can be used to statically and dynamically balance an entire spacecraft, e.g. a spin stabilized satellite.

FIGS. 1A and 1B illustrate one example of a typical prior art mass trim mechanism that uses a leadscrew. As shown in FIG. 1A, the movable mass 100 is a single lumped element that can be translated in either direction along a slider rail 102 which supports the mass 100. The movable mass 100 is engaged with a leadscrew 104. Movement of the mass 100 is facilitated by driving the leadscrew 104 with a motor assembly 106 positioned at one end of the leadscrew 104. FIG. 1B illustrates the complexity of movable mass 100 assembly in requiring a large number of parts.

FIG. 1C illustrates another prior art mass trim mechanism. In this example, the movable mass is enclosed within the housing 108. The end of the leadscrew 104 is visible at end of the housing 108 and the motor assembly 106 to drive the leadscrew 104 is shown at the other end of the housing 108.

FIG. 1D illustrates yet another example of a prior art mass trim mechanism. In this case, the motor assembly 106 is attached to the movable mass 100 and effectively becomes part of the moveable mass 100. The motor assembly 106 and movable mass 100 together translate along the leadscrew 104 to adjust the spacecraft mass properties. Merging the motor assembly 106 with the movable mass effectively improves the overall mass efficiency of the design when compared to the designs of FIGS. 1A–1C, above. However, power and control of the mechanism must be brought to the movable mass 100 through wiring 110. This complicates the design of FIG. 1D and potentially undercuts the overall reliability.

The critical performance measurement of a mass trim mechanism can be defined as the amount of moveable mass times the maximum travel length. This figure indicates the maximum amount of influence that the mass trim mechanism can have on the mass properties of the attached mechanical structure. The additional components of the mechanism (i.e., everything except the movable mass) can be described as the mass overhead. All of the foregoing mass trim mechanisms use a mass that translates along a leadscrew 104. Such designs are inefficient in terms of the amount of movable mass and the travel distance relative to their total mass. Mass efficiency can be roughly defined as the movable mass divided by the total mass.

Another problem associated with conventional mass trim mechanisms is that they present problems being secured during launch. Prior to launch, the mass is typically positioned so that the center of gravity of the associated mechanical structure is nominally positioned. Accordingly, the movable mass is usually centered on the leadscrew, allowing the maximum adjustment in either direction after the satellite has achieved its orbit. In addition, if the mechanism fails during launch, negative impact on the mission is minimized. However, positioning the movable mass in the center of the leadscrew for launch presents some difficulty in securing the mechanism. The leadscrew and supporting structure must be sized to survive the launch loads while in this configuration. If longer travel or a larger mass are required, a larger and heavier leadscrew and support structure are needed. Alternately, an additional locking mechanism can be used to secure and support the movable mass during launch. In any case, these solutions add further to the overhead mass, complexity and cost of developing and delivering conventional mass trim mechanisms and potentially negatively impact reliability.

Accordingly, there is a need for mass trim mechanisms and methods which minimize mass overhead and increase mass efficiency. There is further a need for such mechanisms and methods which provide greater performance, i.e. more movable mass and/or a increased displacement distance. There is also a need for such mechanisms and methods which are simple, less costly and easily locked for launch. As detailed hereafter, these and other needs are met by the present invention.

SUMMARY OF THE INVENTION

This invention presents an apparatus and method for adjusting the center of gravity position of a mechanical structure. An exemplary apparatus includes a storage spool, an output spool and a flexible material having a first end coupled to the storage spool and a second end coupled to the output spool. The flexible material has a length distributed between windings of the storage spool and the output spool to adjust mass properties of an attached structure.

In some embodiments, the storage spool can be spring loaded to wind the flexible material onto the storage spool. A motor assembly is used to wind the flexible material between the storage spool and the output spool. The motor assembly can comprise a stepper motor and a gearhead assembly. In a typical embodiment, the storage spool is spring loaded to wind the flexible material onto the storage spool and the motor assembly is alternately controlled to allow the flexible material to wind onto the storage spool and to overcome the spring loading and wind the flexible material onto the output spool.

In some embodiments, the flexible material can comprise either a metal ribbon or a wire. The metal ribbon can comprise a spring that spring loads itself onto the storage spool.

In further embodiments, the flexible material can have either a direct or an indirect path between storage spool and the output spool. An indirect path can be constructed using one or more guides, e.g. pulleys or pins, to route the flexible material. In addition, one or more guides can be employed can be employed to support the flexible material, such as during a launch environment. Latches can also be employed to prevent the flexible material from being damaged or disengaged from the spools, particularly in embodiments which employ a spring as the flexible material.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Mass Trim Mechanism Schematics

Figure 1A:
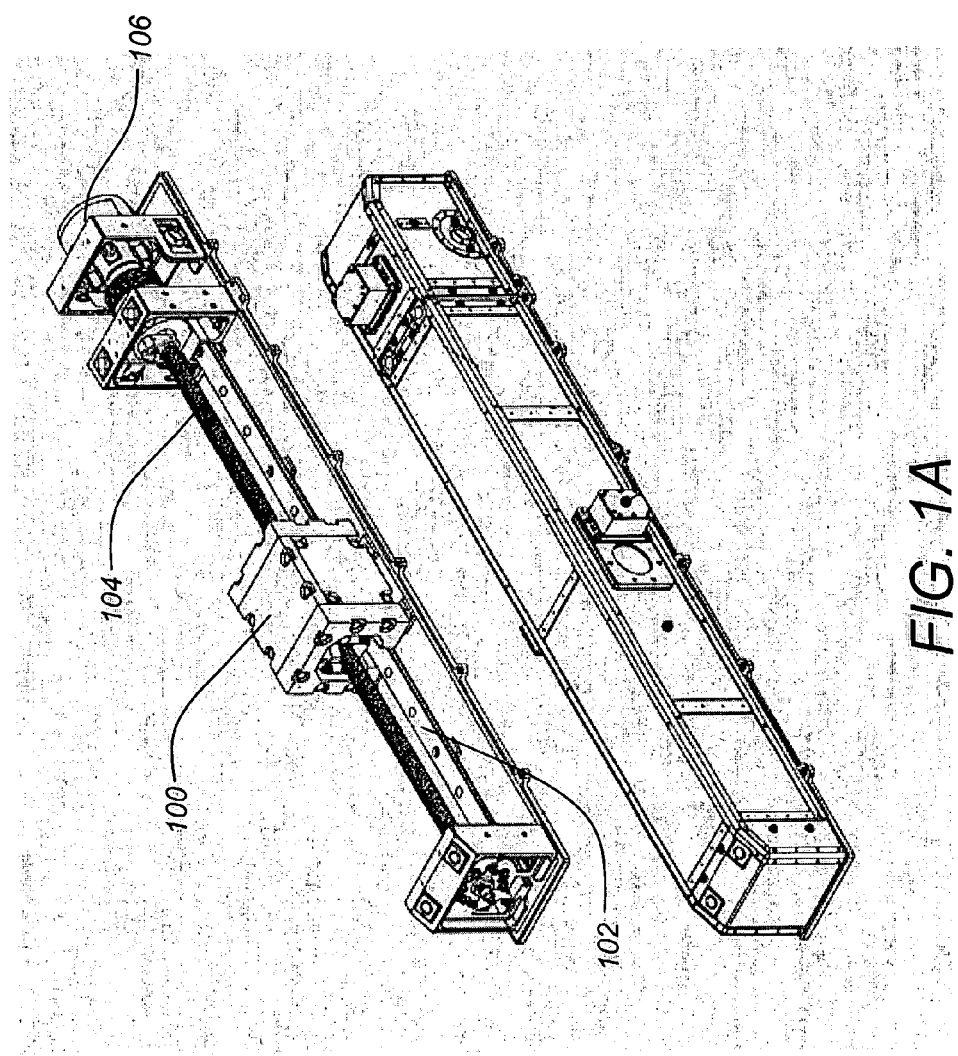
FIGS. 1A–1D illustrate some prior art mass trim mechanisms.
Figure 1B:
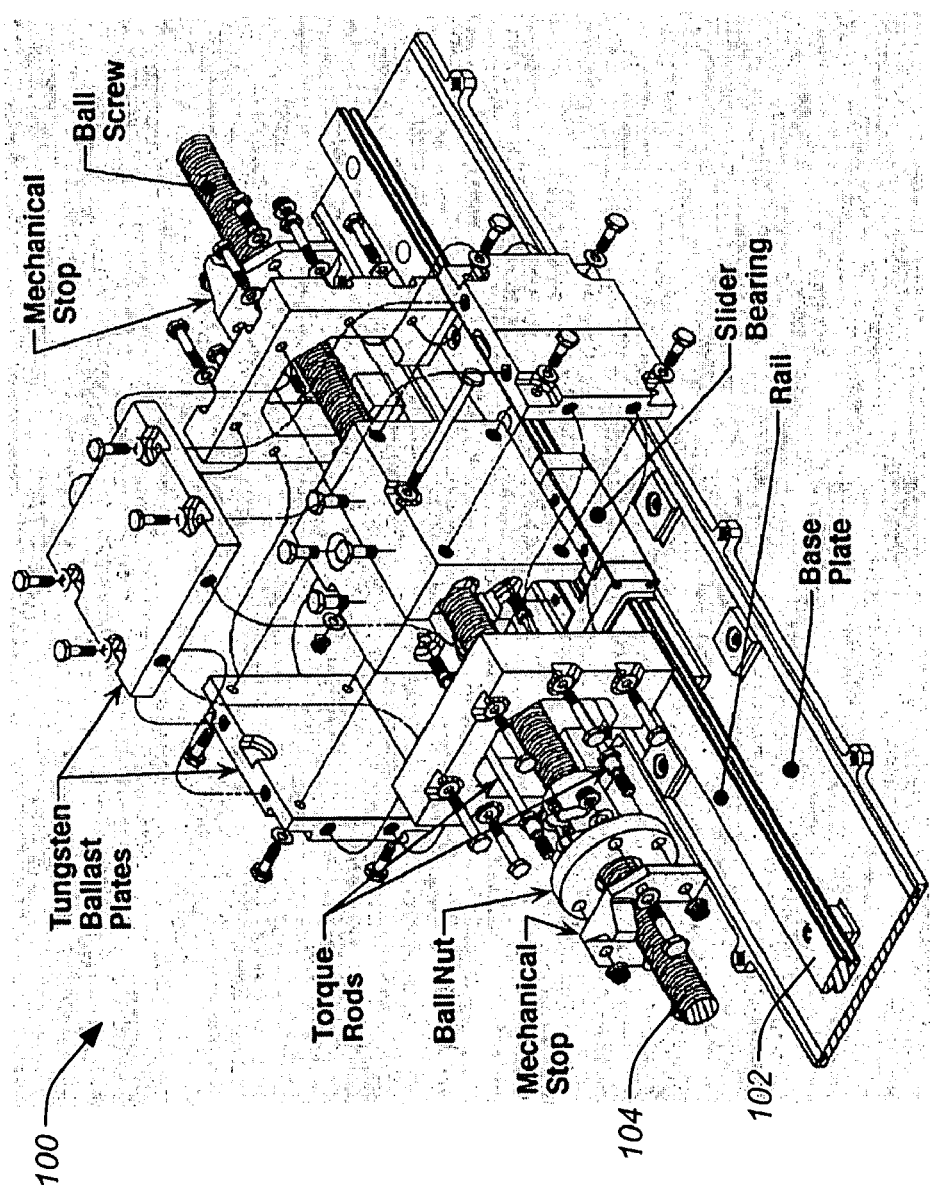
Figure 1C:
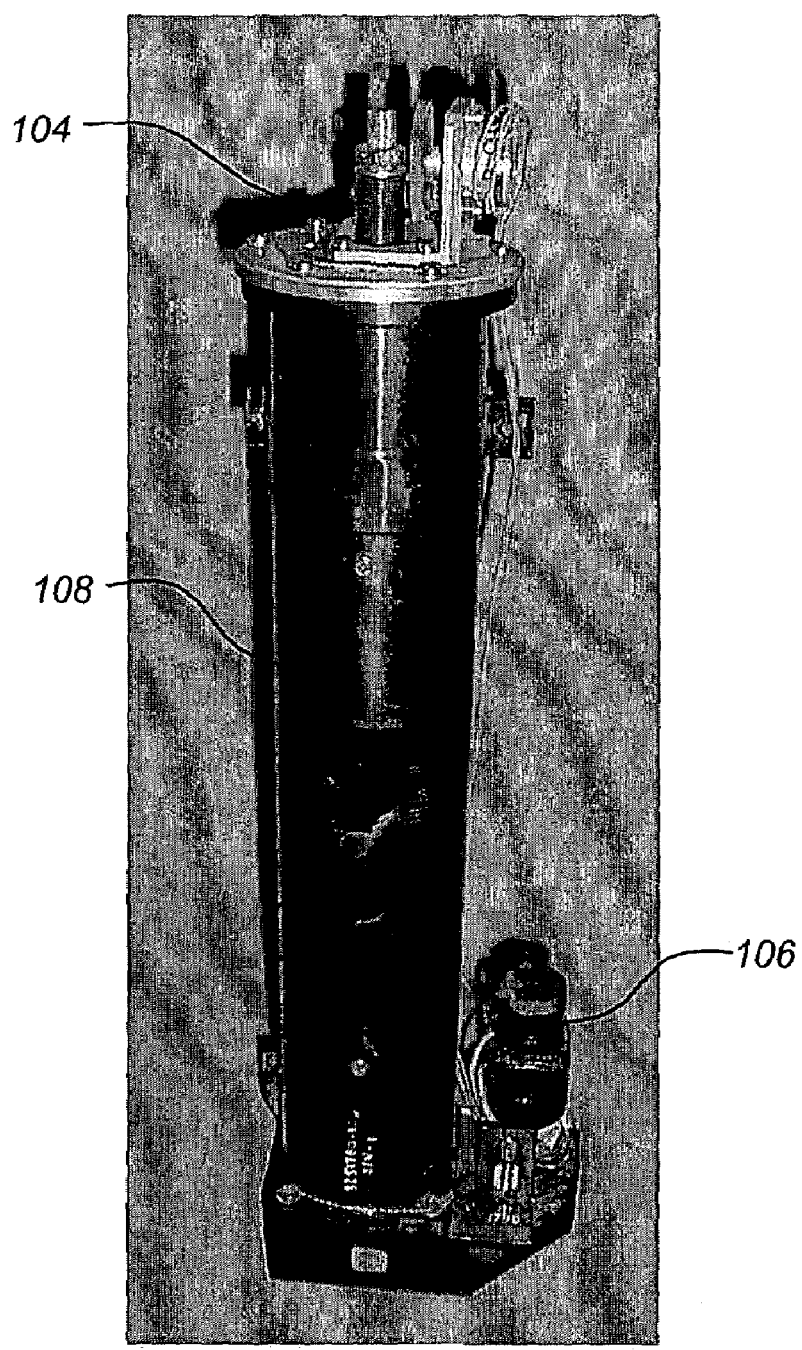
Figure 1D:
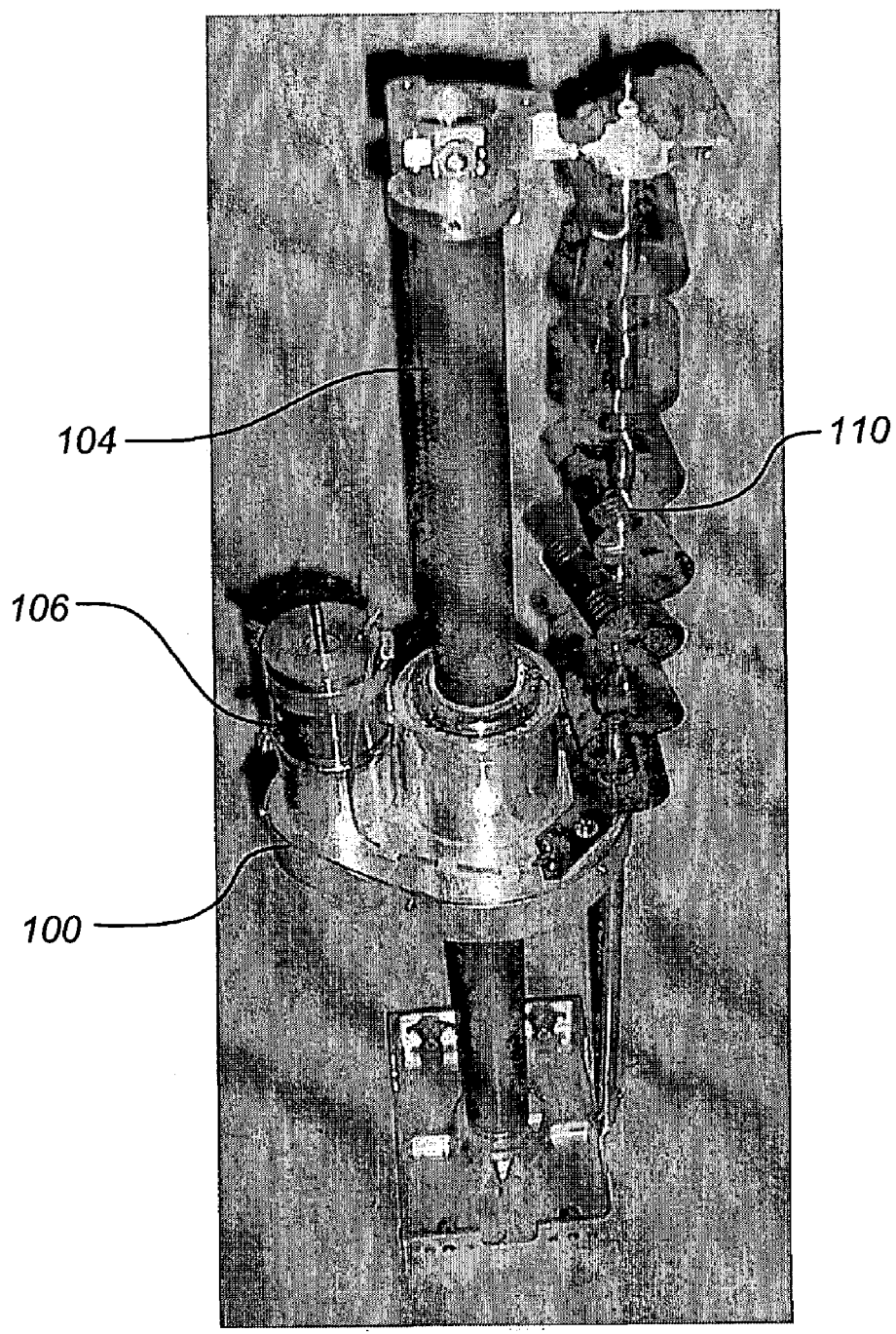
Figure 2A:
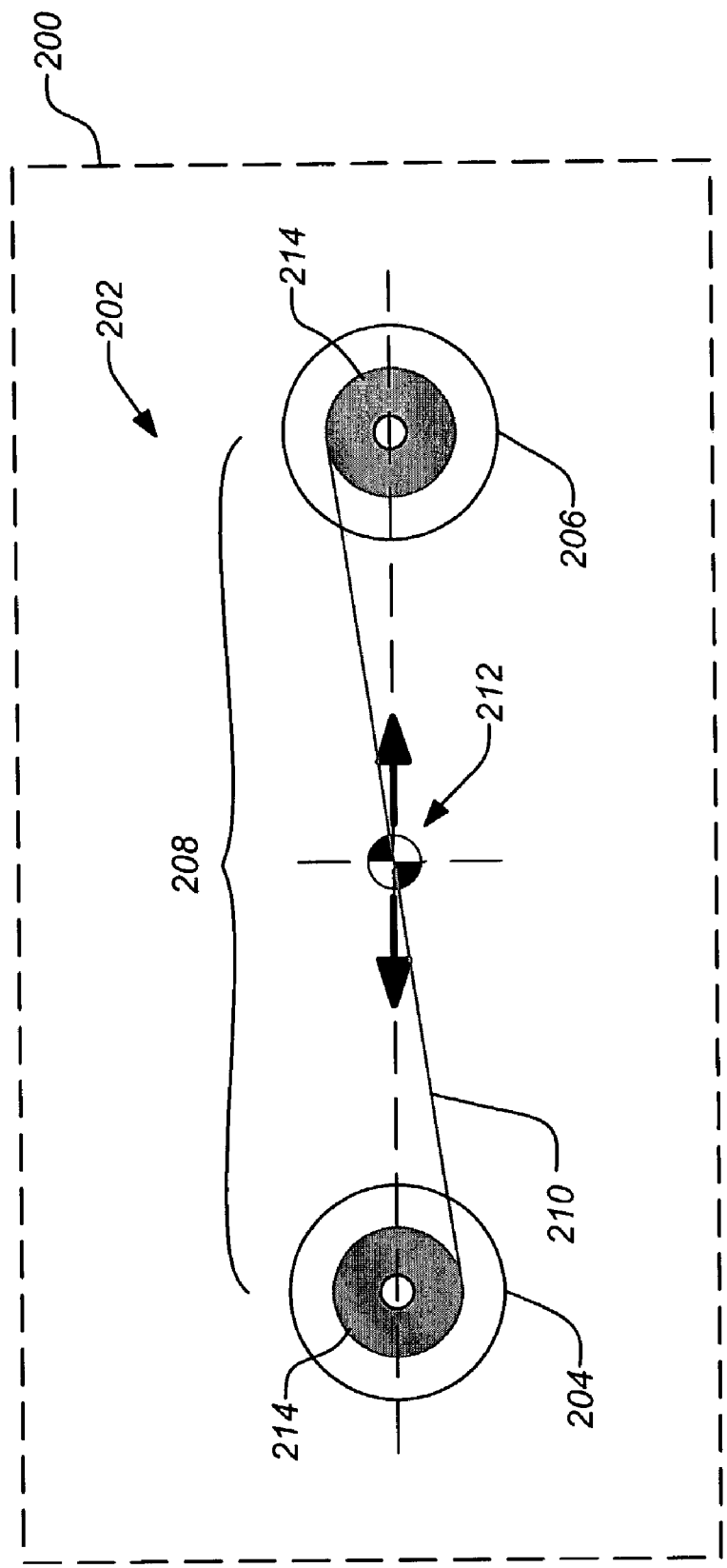
FIGS. 2A–2C are schematic diagrams of an exemplary embodiments of the invention.

FIG. 2A is a schematic drawing of an exemplary embodiment of the invention. A mass trim mechanism 202 is operated to adjust the mass properties of the attached mechanical structure 200 (e.g., by adjusting the center of gravity position 212 of the mass within the mechanism 202). The exemplary mass trim mechanism 202 comprises a storage spool 204 and an output spool 206 which are disposed a distance 208 apart from each other. A flexible material 210 has a first end coupled to the storage spool 204 and a second end coupled to the output spool 206. The length of flexible material 210 is distributed between windings 214 on the storage spool 204 and the output spool 206. Controlling the distribution of flexible material 210 between the windings 214 of the storage spool 204 and the output spool 206 adjusts the center of gravity position 212 as the mass of the flexible material 210 is transferred between the spools 204, 206.

The adjusted center of gravity position 212 is shown directly between the two spools 204, 206 with arrows indicating a change alternately toward either of the two spools 204, 206. This indicates approximately the position and adjustment directions of the center of gravity of the mass trim mechanism 202. As is well known in the art, this adjustment of the center of gravity position of the mass trim mechanism 202 can be employed to statically and/or dynamically balance the attached structure 200.

The flexible material 210 can comprise a wire, metal tape or any other suitable medium which can be wound onto the spools 204, 206. For embodiments of the present invention, all of the flexible material in the windings 214 is the movable mass. However, it is interesting to note that the mass overhead includes the span of flexible material 210 across the distance 208 between the storage and output spools 204, 206. This is because this amount of material is a constant that never accumulates on either of the spools 204, 206. A thin cross section is desirable in order to minimize the mass overhead of the flexible material 210 in the separation distance 208. A thin cross section also increases the operating resolution of the mass adjustment— less mass is moved for the same change in motor position. Resolution can also be increased by employing a smaller spool diameters and a narrower flexible material width (e.g. a wire will yield a particularly high resolution) as well as changing the motor and gearhead. Overall, a wider separation distance 208 is preferable, if possible, to improve the overall benefit resulting from the minimized mass overhead in the separation distance when compared with conventional designs.

Distributing the windings 214 of flexible material 210 between the spools 204, 206 can be accomplished by any suitable drive arrangement. For example, in one embodiment one of the spools, e.g. the storage spool 204, is spring loaded to wind the flexible material 210 onto itself. A motor assembly attached to the other spool 206 is used to control the distribution of flexible material 210 between the two spools 204, 206. Driven in the forward direction, the motor assembly draws the flexible material 210 from the storage spool 204 to the output spool 206. If the motor assembly is driven in reverse, the spring loaded storage spool 204 draws the flexible material 210 back from the output spool 206.

In one notable embodiment the flexible material 210 can be formed from a metal tape of spring steel. In this case, the spring is coupled to the storage spool 204 and coupled and bent backward and attached to the output spool 206, i.e., referred to as motor form B. (Other designs can employ a metal tape coiled in the same direction, i.e., motor form A.) The motor assembly preferable includes stepper motor and a gear train. However, controlled DC motors and any other suitable drive source for controlling the distribution of flexible material 210 between the two spools 204, 206 can also be used.

Figure 2B:
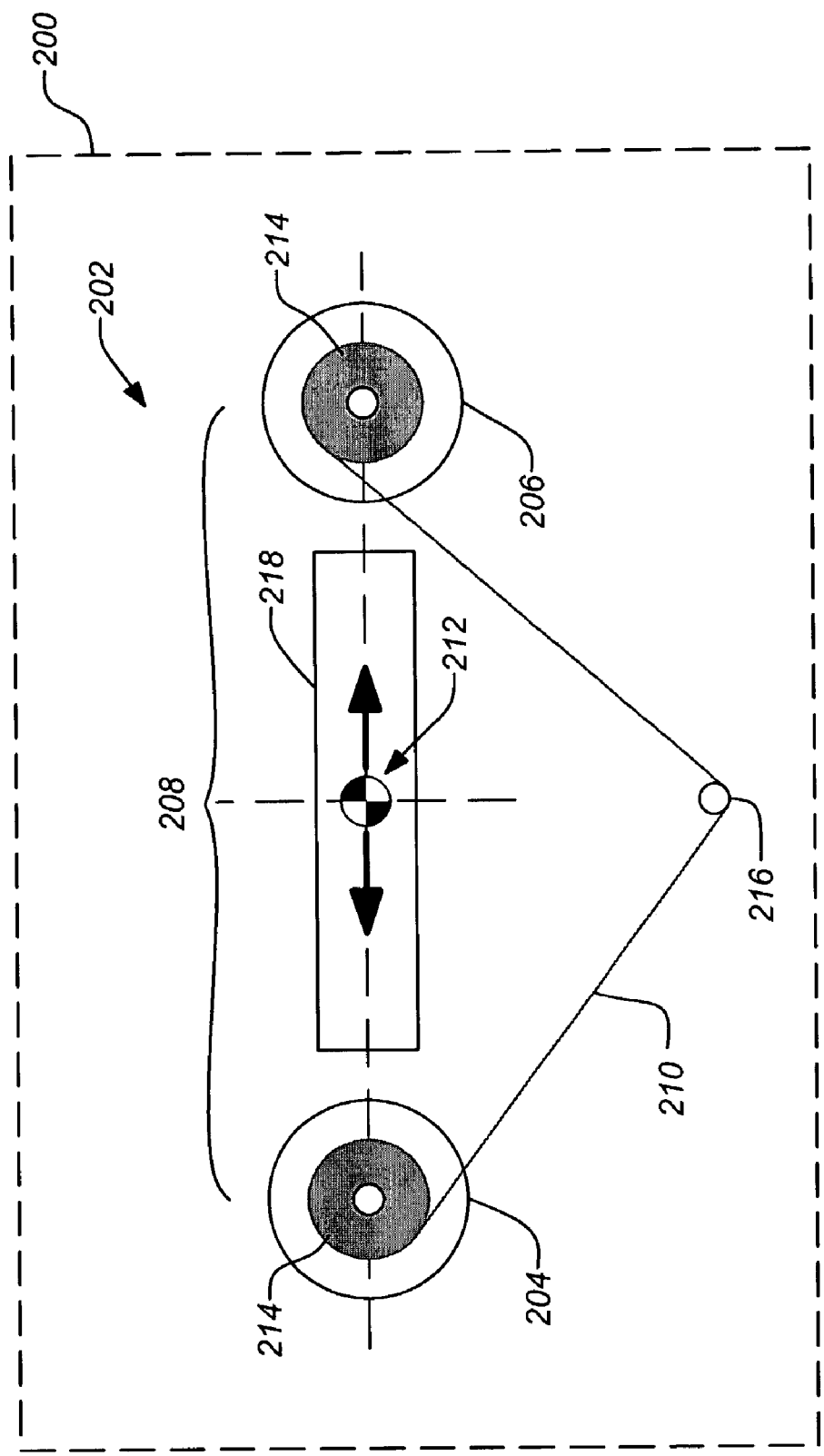

FIG. 2B is a schematic drawing of a further embodiment of the present invention. The embodiment of FIG. 2A shows the flexible material 210 having a direct path between the storage and output spools 204, 206. In FIG. 2B, a single guide 216 is used to allow the flexible material 210 to have an indirect path between the spools 204, 206. In this embodiment, the flexible material 210 is routed from the storage spool 204, around the guide 216, to the output spool 206. Thus, the invention affords much greater flexibility in the design layout on the underlying mechanical structure. Although the adjustment to the center of gravity position still occurs as discussed above (along a line of action between the two spools 204, 206), this embodiment can be employed with intervening structural elements 218. This represents a significant advantage over prior art mass trim mechanisms, which require an unobstructed straight line path for adjusting mass.

The guide 216 can be any suitable carrier for the moving flexible material 210. For example, a pulley, bushing or a simple pin can be used depending upon the design requirements of the mass trim mechanism 202. Embodiments need not be mounted to the same base as a self-contained mechanism. This can be important where one or more guides 216 are employed to form an indirect path for the flexible material 210. Such mechanisms can be integrated into the underlying mechanical structure 200, i.e. the spools 204, 206 and guides 216 will be individually mounted and integrated into the structure 200 as a system.

Figure 2C:
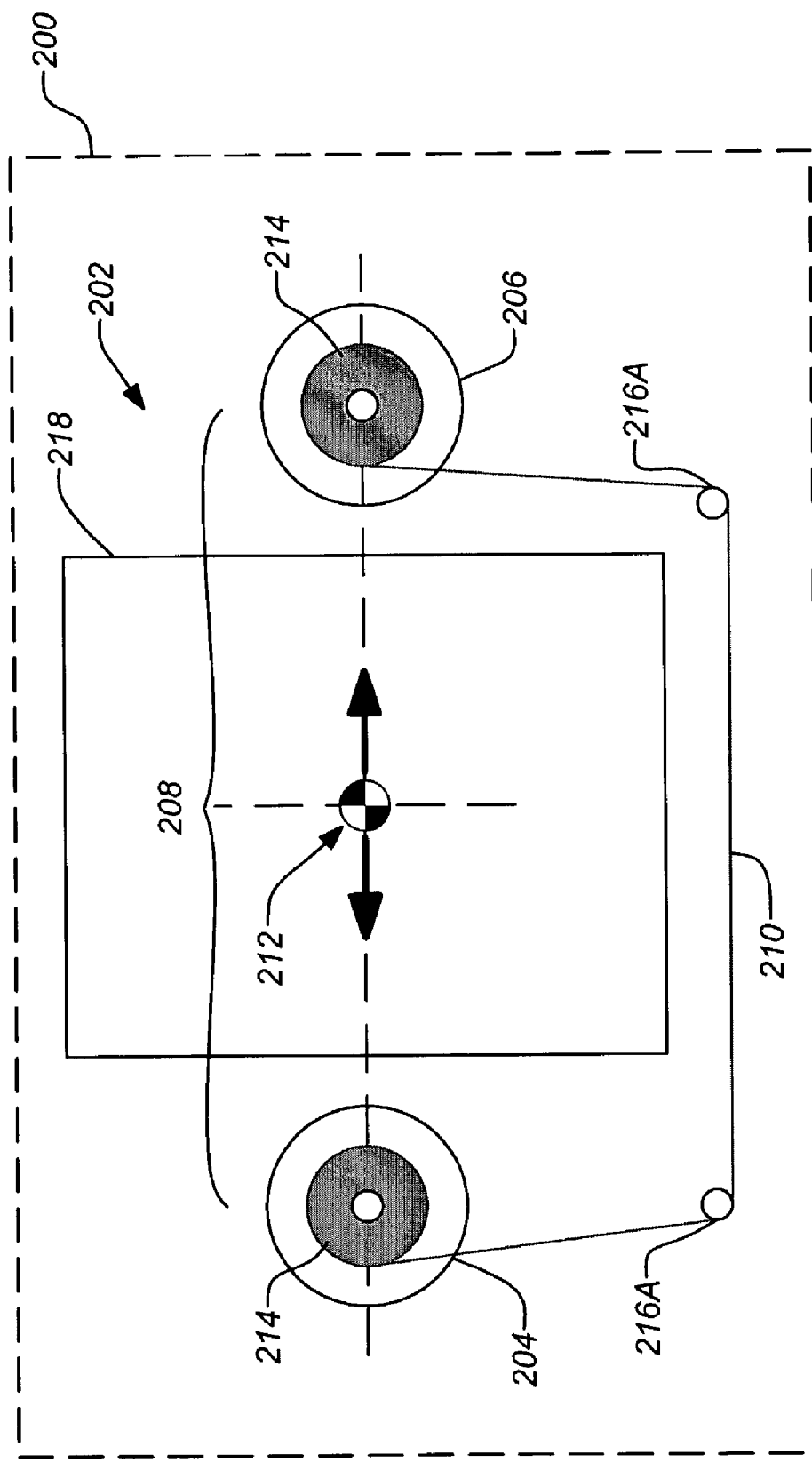

FIG. 2C is a schematic drawing of yet another embodiment of the present invention. In this case, more than one guide 216A, 216B is used to illustrate how even very large intervening structural elements 218 can be accommodated by the present invention.

2. Exemplary Mass Trim Mechanisms

Figure 3A:
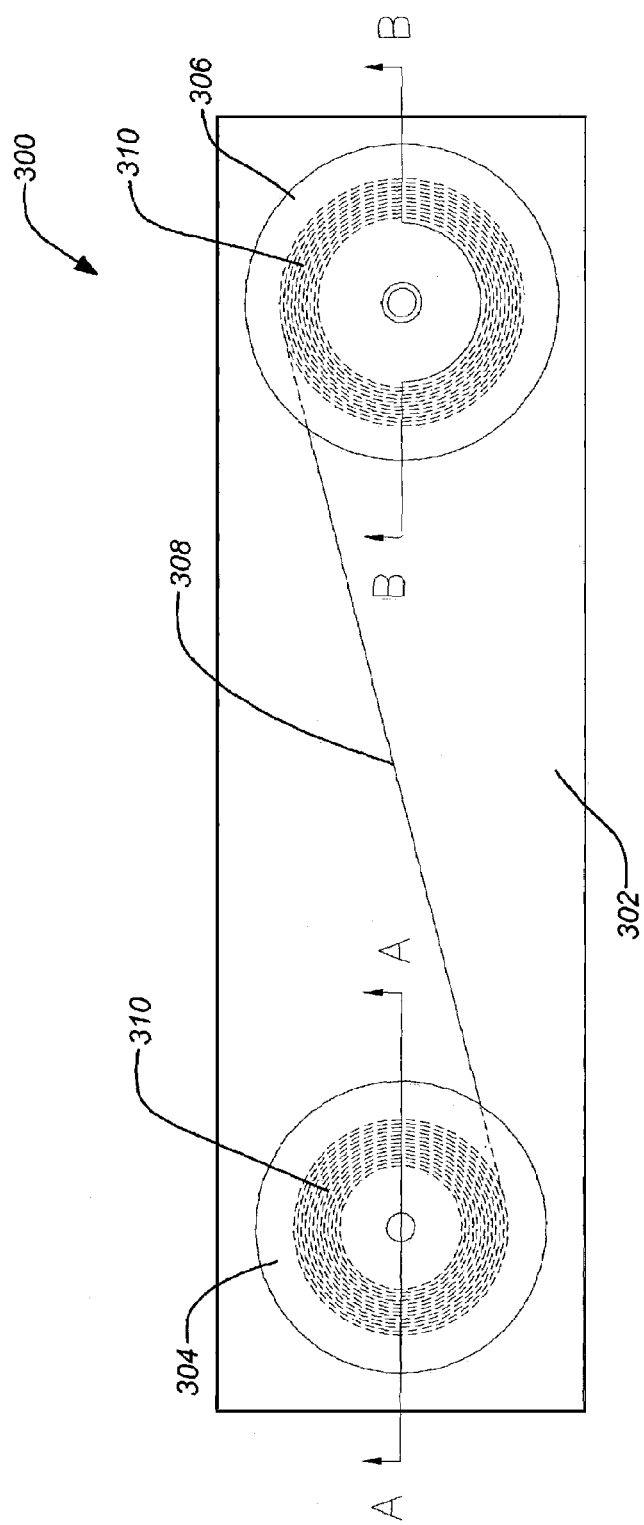
FIGS. 3A–3D are drawings of an exemplary embodiment of the invention.

FIG. 3A is a drawing of a top view an exemplary embodiment of the invention. The exemplary mass trim mechanism 300 includes a mounting base 302 for supporting the affixed storage and output spools 304, 306. A metal tape which acts as a spring 308 (such as a known constant force spring) is employed as the flexible material, with windings 310 distributed between the two spools 304, 306. The spring 308 can be arranged on the spools 304, 306 so that it is biased to wind itself onto the storage spool 304 with a substantially constant force.

The constant force spring 308 of known mass has a natural radius of curvature just smaller than the storage spool 304. The spring 308 is wrapped around the storage spool 304 normally and is back-bent around the output spool 306. If unrestrained, the spring 308 will wind up around the storage spool 304. This produces a substantially constant torque at the slightly larger output spool 306. For more information regarding the design characteristics of constant force springs, see F. A. Votta, "The Theory and Design of Long-Deflection Constant-Force Spring Elements" Transactions of the ASME, 1952, pp. 439–450, which is incorporated by reference herein.

Figure 3B:
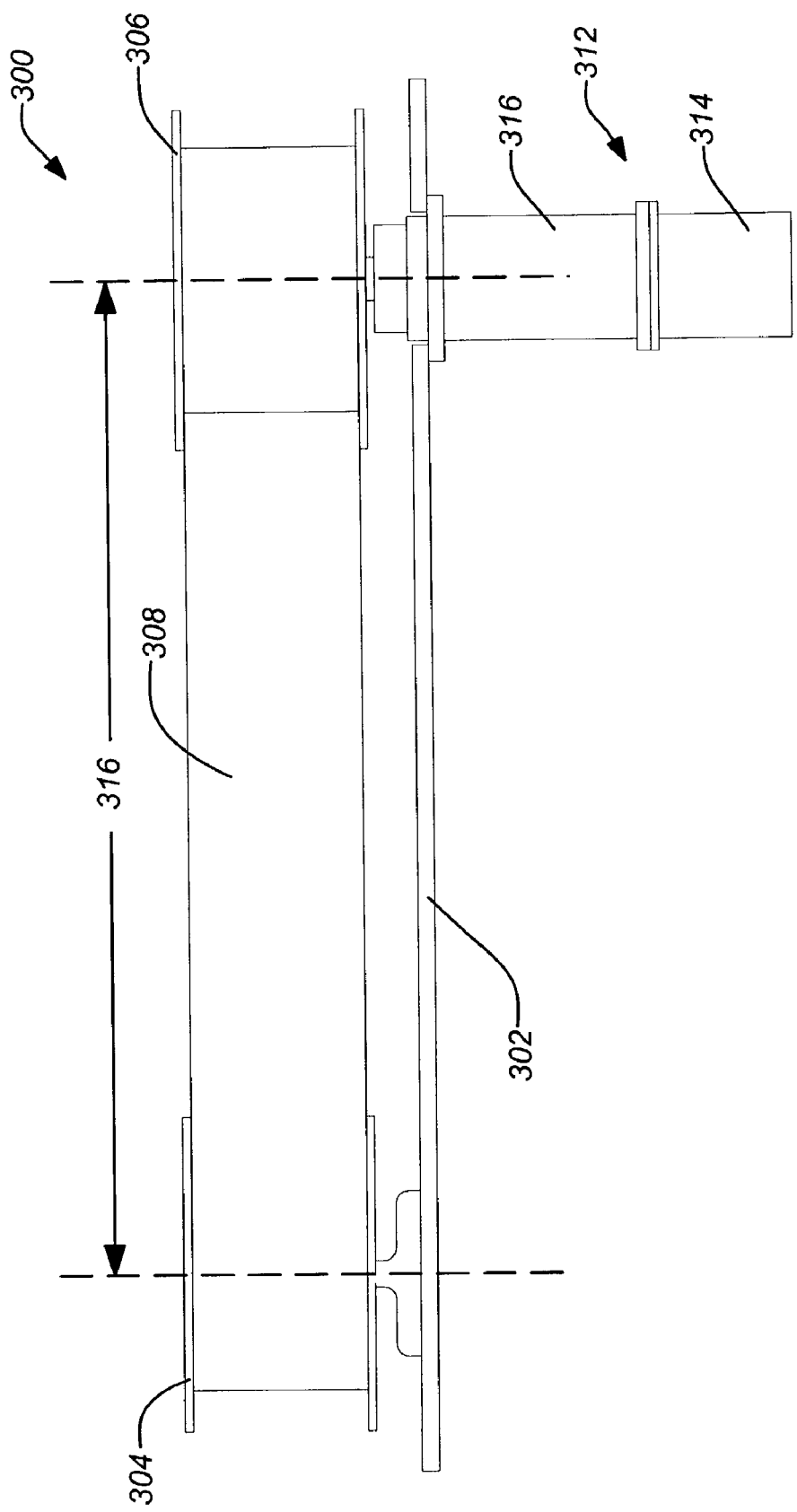

FIG. 3B is a drawing of a side view the exemplary embodiment FIG. 3A. The output spool 306 can be mounted on a stepper motor 314 and gearhead 316 assembly 312. The detent of the stepper motor 314 keeps the output spool 306 from rotating while the stepper motor 314 is not being used. The storage spool 306 is mounted on bearings and is located a distance 318 from the output spool 306. The movable mass (i.e., the spring 308) is transferred from one spool to the other by commanding the motor 314 to move a known number of steps; forward to wind the spring 308 onto the output spool 306 and backward to wind onto the storage spool 304. The balance resolution can be increased or decreased by using a motor 314 with a different number of steps per revolution, selecting a different gearhead 316 ratio, and by varying the width, thickness and/or density of the flexible material or spring 308, as previously discussed.

Figure 3C:
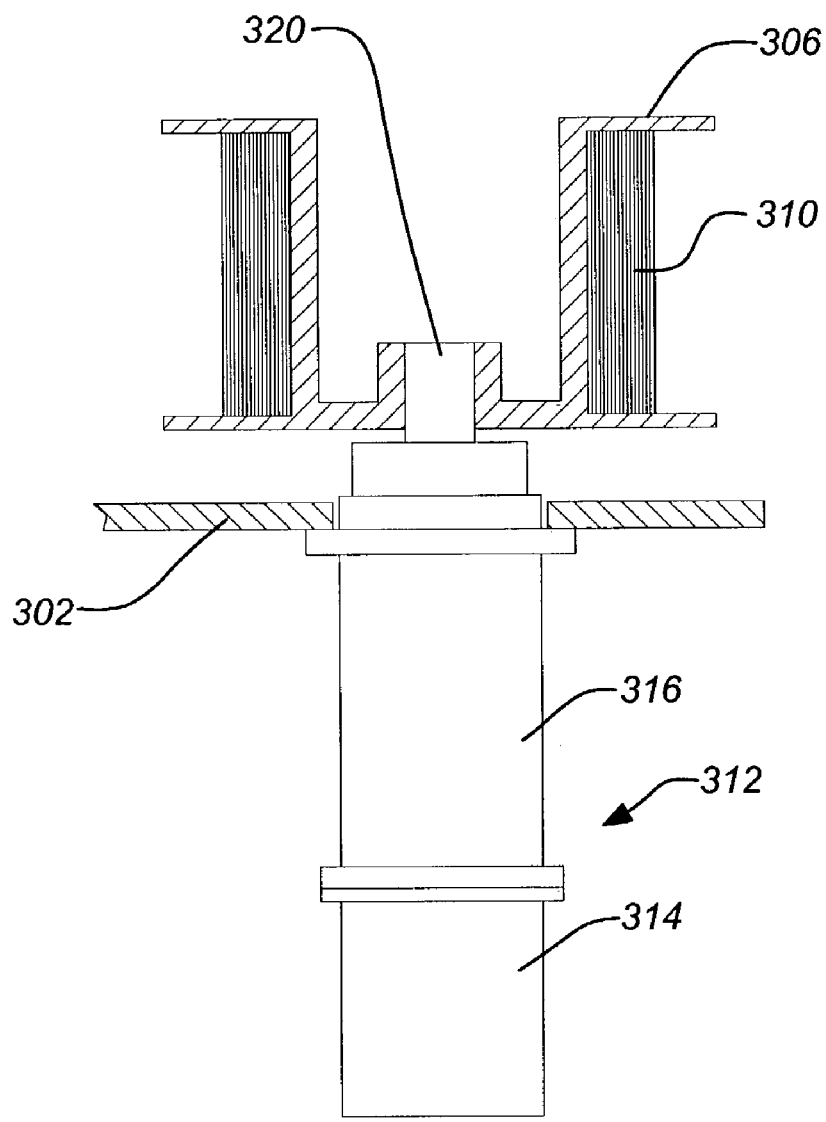
Figure 3D:
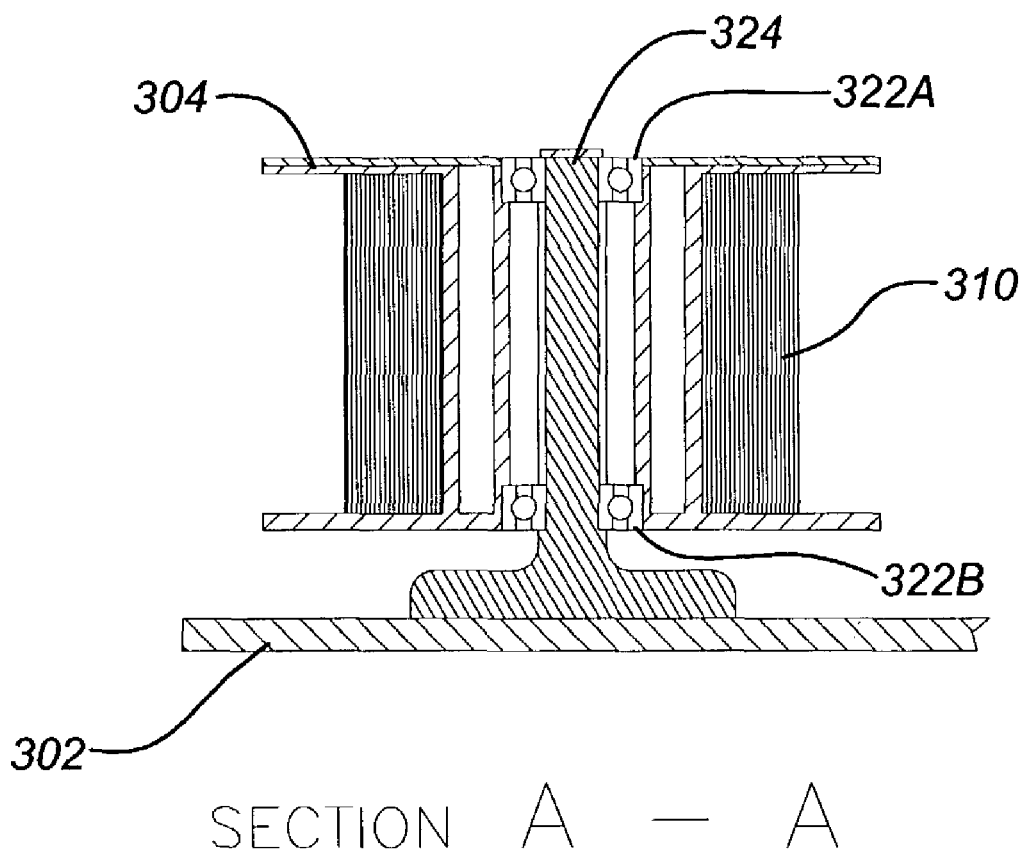

FIGS. 3C and 3D are drawings of section views of the output spool and storage spool, respectively, of the exemplary embodiment FIG. 3A. As shown in FIG. 3C, the output spool 306 is mounted directly onto the shaft 320 of the gearhead 316. Bearing support is internal to the gearhead 316. The storage spool 304 of FIG. 3D is shown supported by two bearings 322A, 322B on a shaft 324 affixed to the base 302.

Embodiments of the present invention possess great design flexibility. Significant changes in movable mass and travel length can be accommodated without adding significant overhead mass. The mass can be changed easily by using a shorter or longer spring. This leads to a family of designs with a common qualification test history, a significant asset when pursuing approval for space applications. The balance resolution can also be changed easily by varying the width and thickness of the spring, using a motor with a different number of steps per revolution, and/or by varying the gearhead ratio.

In addition, in embodiments which employ the constant force springs, either A Motor Form or B Motor Form of the constant torque spring can be used and the output spool and motor and gearhead can be configured in numerous ways, depending on space and mass constraints for the particular application. See F. A. Votta, "The Theory and Design of Long-Deflection Constant-Force Spring Elements" Transactions of the ASME, 1952, pp. 439–450 for a thorough discussion of spring configurations (i.e., Motor Forms).

Figure 3E:
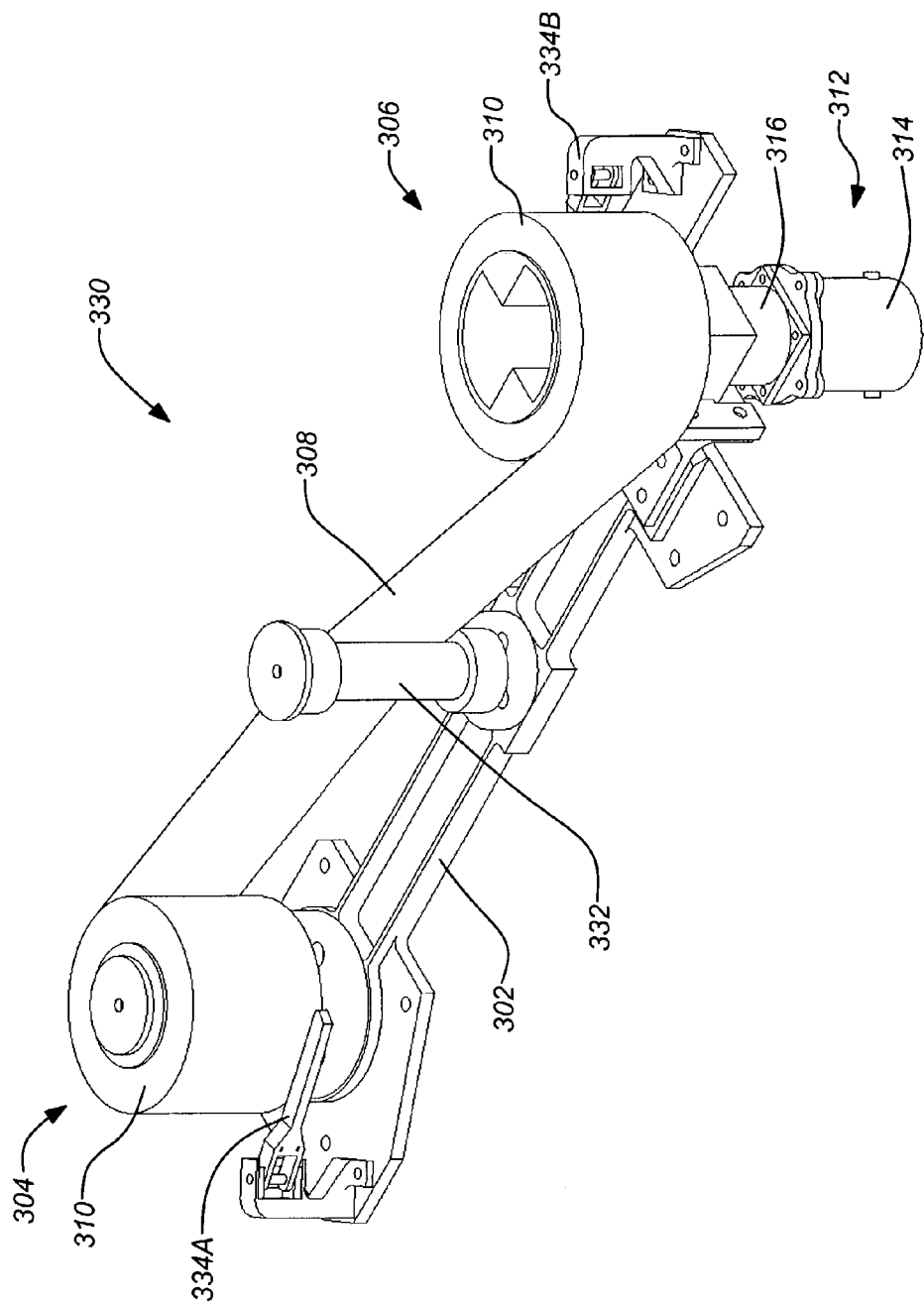
FIGS. 3E–3I are detailed drawings of an second exemplary embodiment of the invention.

FIG. 3E is a detailed drawings of an second exemplary embodiment of the invention. Similar to the embodiment shown in FIGS. 3A–3D, this mass trim mechanism 330 employs a stepper motor 314 and gearhead 316 assembly 312 to control distribution of the spring 308, i.e., the flexible material, between windings 310 on the storage spool 304 and the output spool 306. This mass trim mechanism 330 also includes a central guide 332 which acts as a support of the spring 308 during launch.

In addition, the mechanism 330 includes a latches 334A, 334B on the storage spool 304 and output spool 306, respectively. These latches 334A, 334B are spring loaded against the windings 310 of the spring 308 on the spools 304, 306. The spools 304, 306 each have at least one notch (not shown) such that when the spring is unwound to the point which exposes the notch, the latch 334A, 334B falls into the notch and prevents it from unwinding any further. In this way the spring 308 is prevented from unwinding until it is damaged or disengages from the spools 304, 306.

Figure 3F:
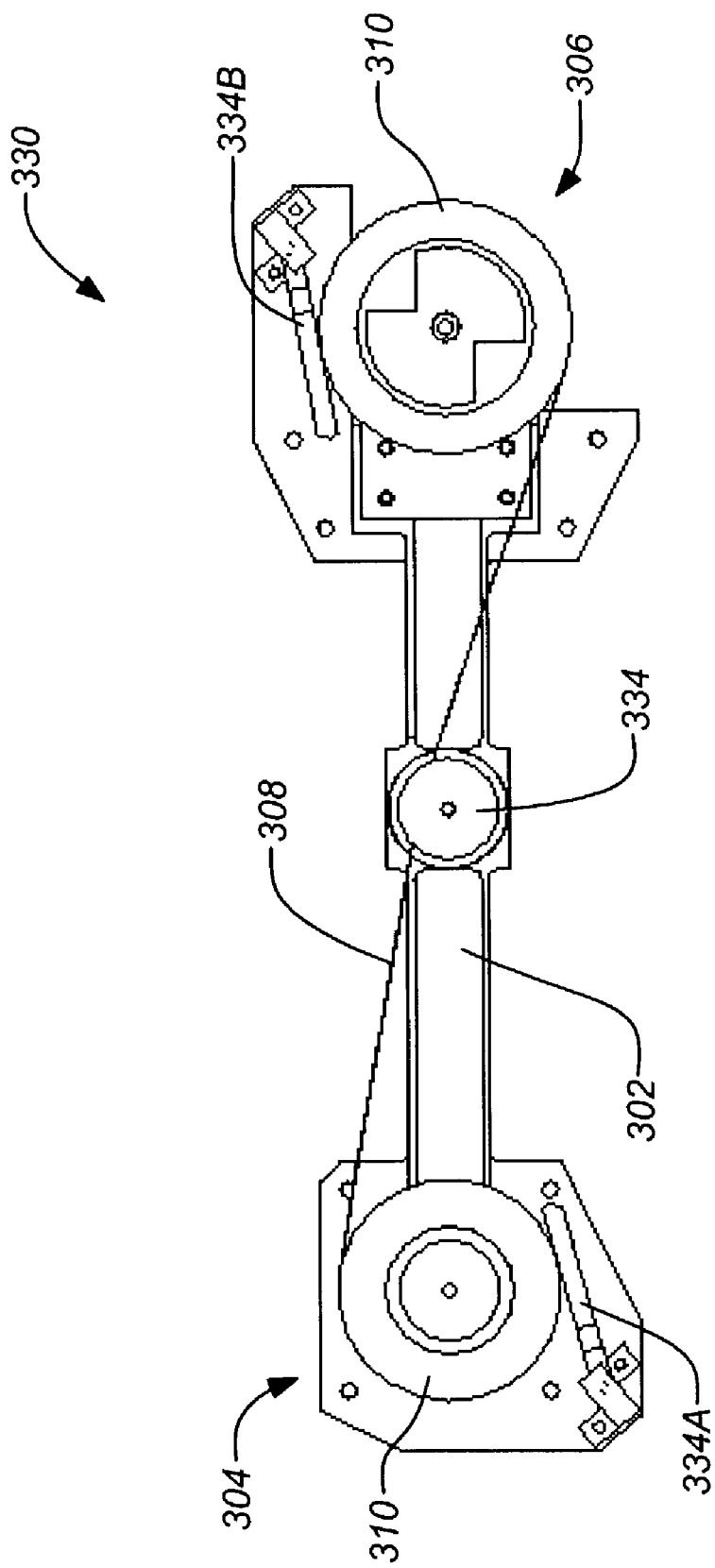
Figure 3G:
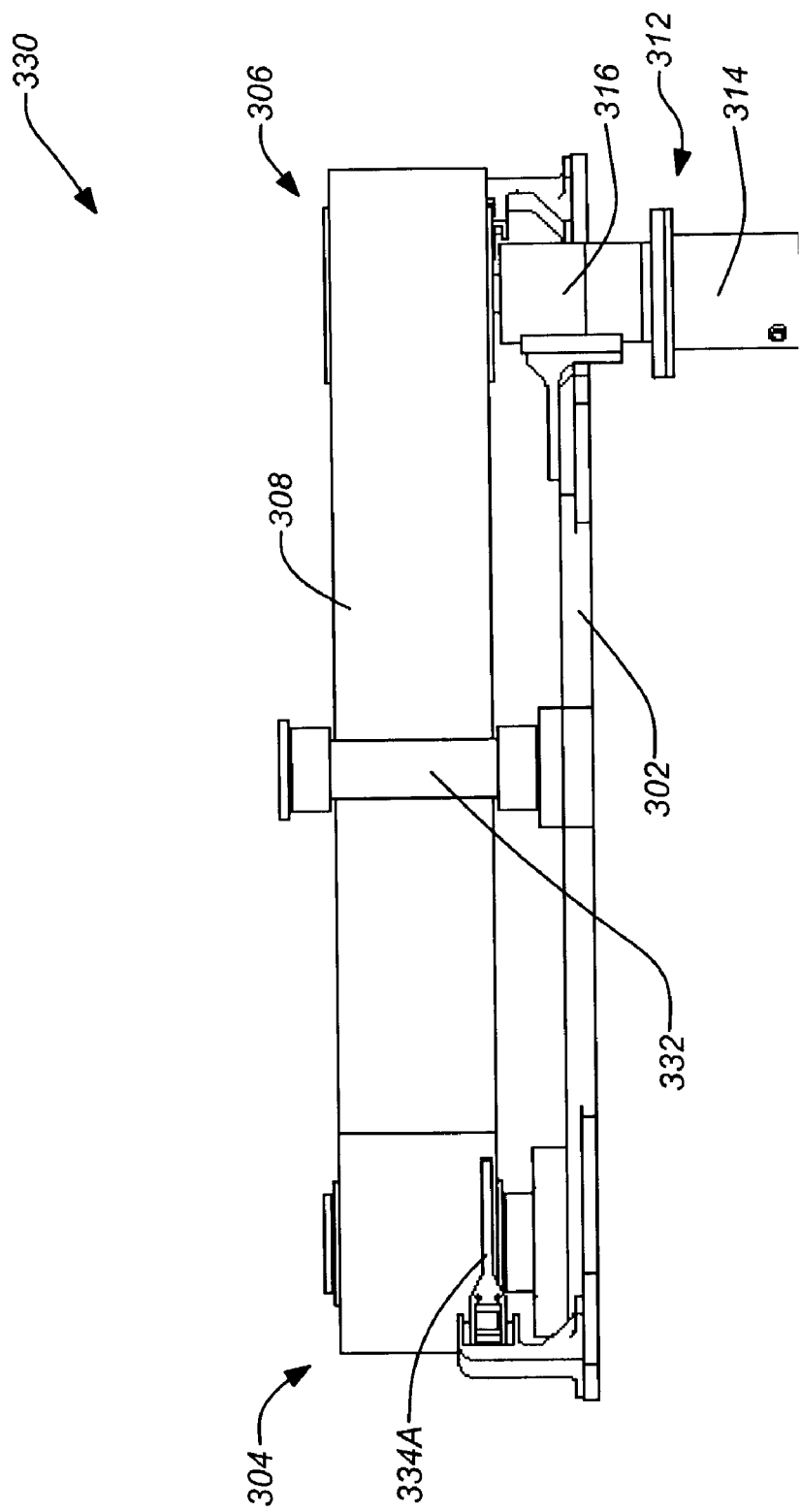

FIGS. 3F and 3G are respectively a top view and a side view of the second exemplary embodiment of the invention. As shown in FIG. 3F, in this exemplary embodiment the guide 332 is not used to form an indirect path as previously discussed; the path is substantially direct.

Figure 3H:
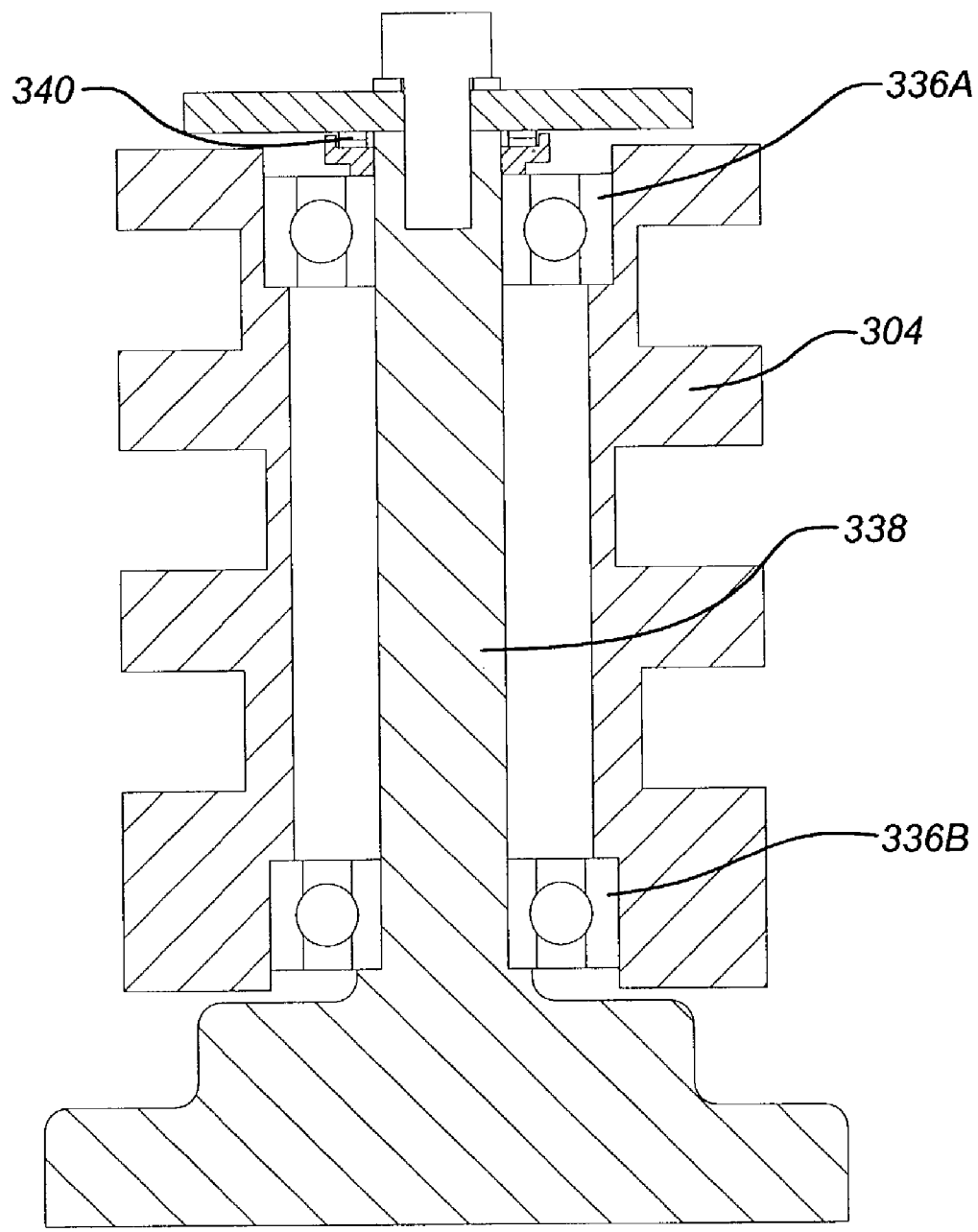

FIG. 3H is detailed drawing of the storage spool assembly of the second exemplary embodiment of the invention. In this embodiment, radial contact bearings 336A, 336B support the storage spool 304 on the shaft 338. Bearing preload is controlled through a spring washer 340 at the capped end of the shaft 338. The output spool 306 is similarly constructed. However, the output spool 306 is driven by an output shaft from the motor/gearhead assembly 312.

Figure 3I:
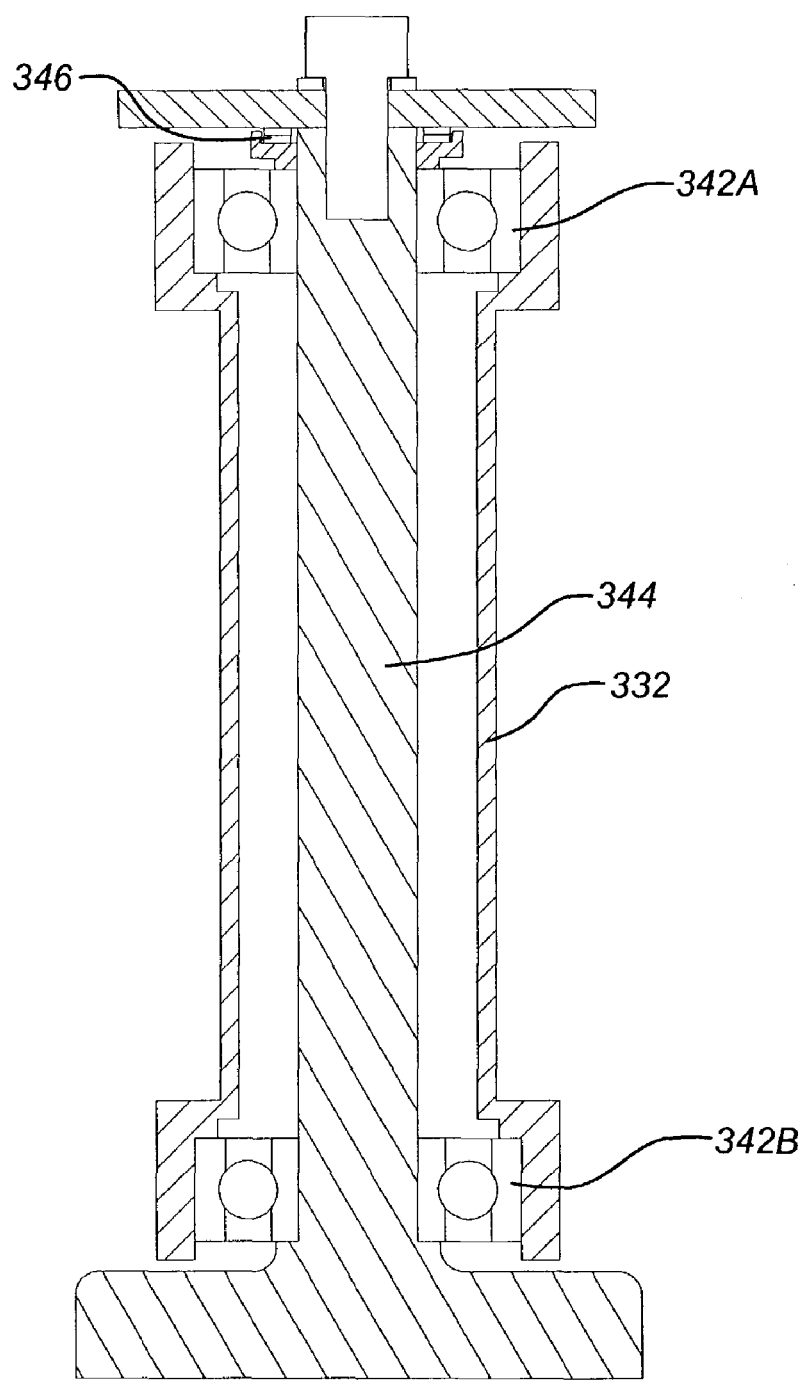

FIG. 3I is a detailed drawing of the roller guide of the second exemplary embodiment of the invention. The roller guide 332 also includes radial contact bearings 342A, 342B which are supported on a shaft 344 with bearing preload controlled through a spring washer 346 as shown.

As previously discussed, one of the primary design goals of any mass trim mechanism is to have a high mass efficiency. This is generally accomplished by increasing the amount of movable mass and/or the mass travel range while minimizing the mass overhead.

Conventional mass trim mechanisms have a mass centered on a long leadscrew. Substantial structural mass is required to survive launch loads. This problem only worsens as the travel range or mass is increased for these existing mechanisms. Because embodiments of the present invention locate the movable mass directly above the mounting location to the spacecraft (the shafts which support the spools), less structural mass is required to survive launch loads. The mass and travel range can be increased with only minimal increases to the structural nonmoving mass. Thus, embodiments of the present invention have a much higher mass efficiency than typical known mass trim mechanisms.

As shown above, embodiments of the invention are very simple in terms of the number and complexity of parts used in a typical design. A common gearhead and motor subassembly can typically be used to drive the mechanism. All other necessary parts are basic and relatively inexpensive to obtain. Conventional mass trim mechanisms such as those that use a mass translating on lead- or ball-screws are much more difficult to design and test and manufacture. The simplicity of embodiments of the present invention leads to reduced costs, faster build cycle times, and higher reliability. In addition, the present invention possesses many other advantages over conventional mass trim mechanisms.

For example, removing backlash in a geartrain, such as gearhead 314, is generally another problem that complicates mechanism designs, including traditional mass trim mechanism designs. However, the present invention solves this problem in a simple and reliable way. In embodiments which use a spring loaded storage spool 306, the spring 308 loading tends to preload out the backlash the gearhead 314. Traditional mass trim mechanisms typically require a separate, more complicated approach to address this issue. Traditional designs also have difficulty protecting against backdriving of the motor due to launch loads or centrifugal loading. However, embodiments of the present invention eliminate this problem since the mass tends to be balanced about the drive train components.

Also, because the present invention locates the mass directly over the mounting location, i.e. the spools, thus allowing larger movable masses and longer travel ranges to be used without adding significant weight to the supporting structure in order to survive launch loads. This invention is therefore more efficient than traditional mass trim mechanisms.

Furthermore, typical mass trim mechanisms using a leadscrew require a cover to keep contaminants or other debris from potentially restricting the movement of the leadscrew (and mass). In contrast, embodiments of the present invention are less susceptible to snagging and jamming because moving components (e.g., spools and flexible material) are not sensitive to jamming from contaminants.

3. Method of Mass Trimming in Space Applications

Figure 4A:
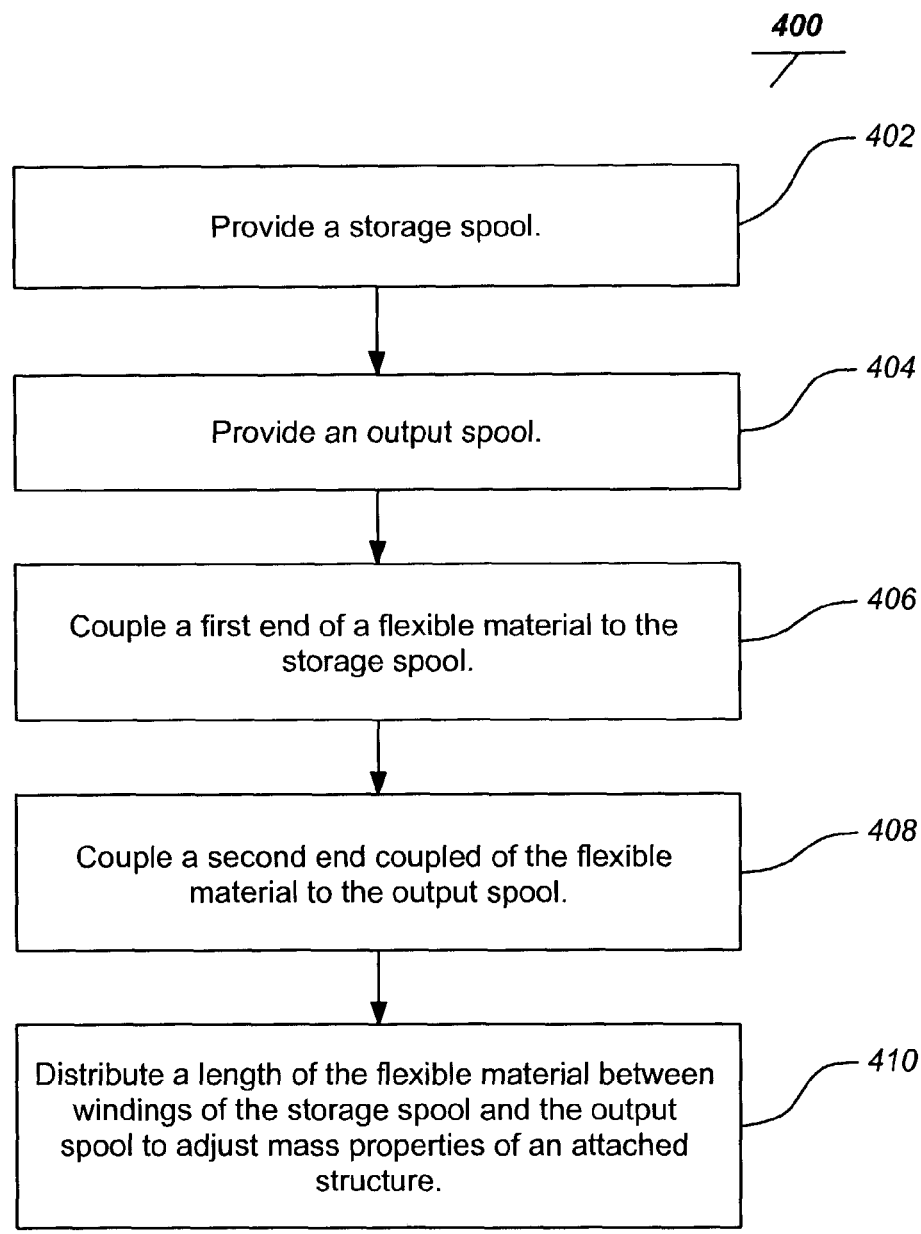
FIG. 4A is a flowchart of an exemplary method of mass trimming according to the present invention.

FIG. 4A is a flowchart of an exemplary method 400 of mass trimming according to the present invention. The method 400 begins at step 402 where a storage spool is provided. Next, at step 404 an output spool is provided. At step 406, a first end of a flexible material is coupled to the storage spool. At step 408, a second end coupled of the flexible material to the output spool. Finally at step 410, a length of the flexible material is distributed between windings of the storage spool and the output spool to adjust mass properties of an attached structure.

Figure 4B:
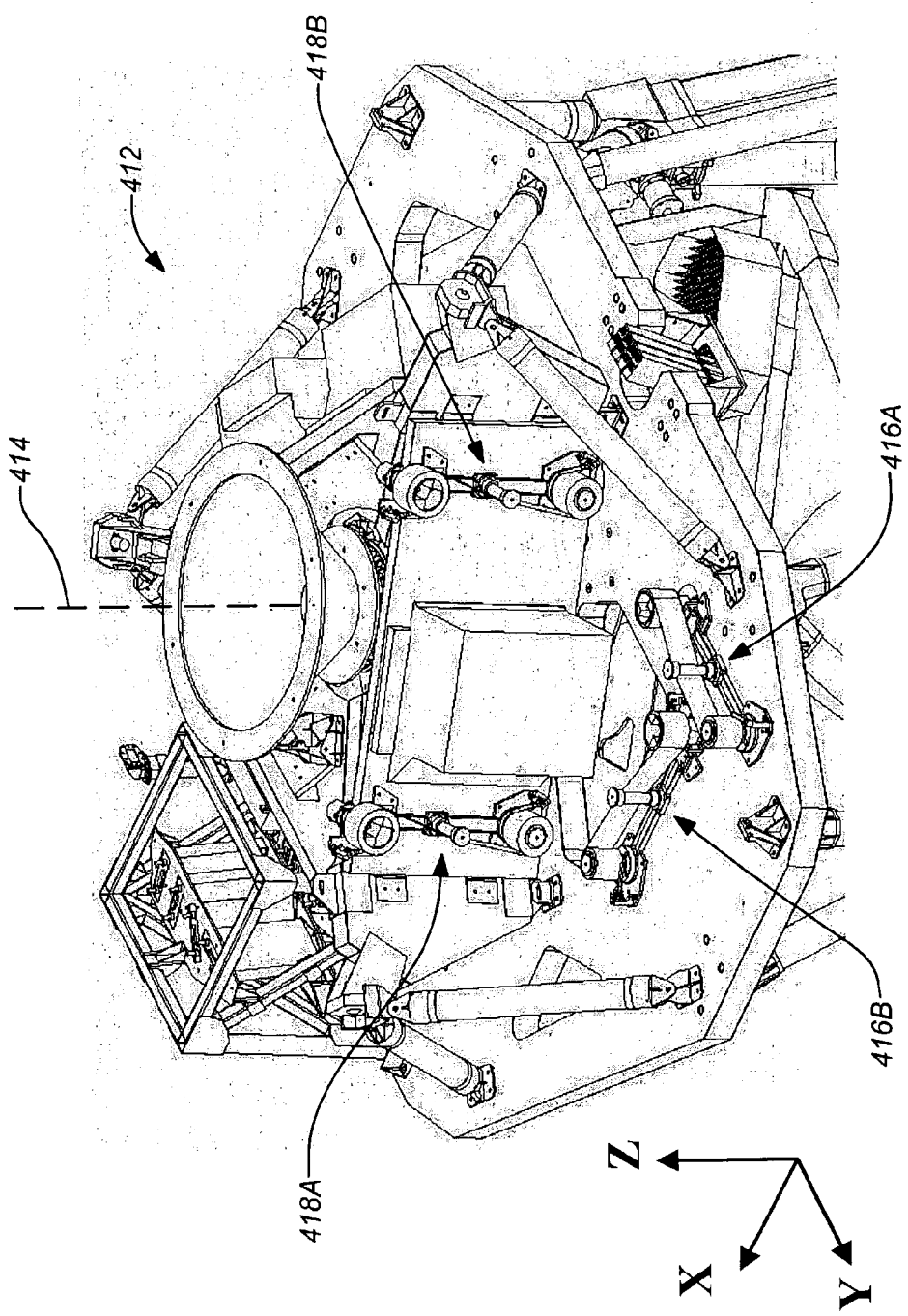
FIG. 4B illustrates an arrangement of mass trim mechanisms in an exemplary spin stabilized spacecraft.

FIG. 4B illustrates an exemplary arrangement of mass trim mechanisms in a spin stabilized spacecraft. Adjustment of the mass properties of the attached structure 412 of the spacecraft can typically include statically and dynamically balancing the structure by adjusting the CG and/or the products of inertia of the structure. The structure 412 has a spin axis 414 parallel to the Z axis approximately as shown. Static imbalance of the attached structure 412 can be reduced or eliminated by using two mass trim mechanisms 416A, 416B in a common plane perpendicular to the spin axis 414 and oriented perpendicular to one another to adjust the CG position within the plane. Mass trim mechanism 416A is aligned along an axis parallel to the Y axis and mass trim mechanism 416B is aligned along an axis parallel to the X axis as shown. Furthermore, dynamic imbalance can be reduced or eliminated by using two other mass trim mechanisms 418A, 418B mounted parallel to (and offset from) the spin axis 414 in planes with the spin axis perpendicular to each other. These mass trim mechanisms 418A, 418B adjust the products of inertia of the attached structure 412.

However, it should be noted that use of the invention is not limited to the exemplary configuration of FIG. 4B. Other configurations and applications of the invention will be readily apparent to those skilled in the art. In general, the invention can be employed wherever adjustment of the mass properties of an attached structure is desired. The method 400 can be further modified in the same manner as the apparatus embodiments previously described.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. An apparatus for trimming the mass properties of a spacecraft, comprising:

a storage spool rotatably mounted on a first shaft, the first shaft being fixedly mounted on the spacecraft on a first side of a center of gravity of the apparatus;

an output spool rotatably mounted on a second shaft, the second shaft being fixedly mounted on the spacecraft on a second side of the center of gravity of the apparatus such that the first shaft, the center of gravity, and the second shaft are substantially colinear along a first line; and a flexible material having a first end coupled to the storage spool and a second end coupled to the output spool, the flexible material traversing a second line, the second line being substantially perpendicular to the first line;

wherein a length of the flexible material is distributed between windings of the storage spool and the output spool to adjust mass properties of the spacecraft by changing the center of gravity of the apparatus.

2. The apparatus of claim 1, wherein the flexible material has a direct path between storage spool and the output spool.

3. The apparatus of claim 1, wherein the flexible material has an indirect path between storage spool and the output spool.

4. The apparatus of claim 3, wherein the indirect path is formed by one or more guides.

5. The apparatus of claim 1, wherein one or more guides support the flexible material.

6. The apparatus of claim 1, wherein the storage spool is spring loaded to wind the flexible material onto the storage spool.

7. The apparatus of claim 1, further comprising one or more latches to prevent the flexible material from disengaging the storage spool or the output spool.

8. The apparatus of claim 1, wherein the flexible material comprises a metal ribbon.

9. The apparatus of claim 8, wherein the metal ribbon comprises a spring, the spring loaded to wind onto the storage spool.

10. The apparatus of claim 1, wherein the flexible material comprises a wire.

11. The apparatus of claim 1, further comprising a motor assembly for winding the flexible material between the storage spool and the output spool.

12. The apparatus of claim 11, wherein the motor assembly comprises a stepper motor.

13. The apparatus of claim 11, wherein the motor assembly comprises a gearhead assembly.

14. The apparatus of claim 11, wherein the storage spool is spring loaded to wind the flexible material onto the storage spool and the motor assembly is alternately controlled to allow the flexible material to wind onto the storage spool and to overcome the spring loading and wind the flexible material onto the output spool.

15. The apparatus of claim 14, wherein the flexible material comprises a spring that spring loads the storage spool.

16. A method for trimming the mass properties of a spacecraft, comprising the steps of:
   providing a storage spool rotatably mourned onto a first shaft fixedly mounted on the spacecraft on a first side of a center of gravity of an apparatus;
   providing an output spool rotatably mounted onto a second shaft fixedly mounted on the spacecraft on a second side of the center of gravity of the apparatus such that the first shaft, the center of gravity, and the second shaft are substantially colinear along a first line;
   coupling a first end of a flexible material to the storage spool;
   coupling a second end coupled of the flexible material to the output spool such that the flexible material traverses a second line, the second line being perpendicular to the first line; and
   distributing a length of the flexible material between windings of the storage spool and the output spool to adjust mass properties of the spacecraft by changing the center of gravity of the apparatus.

17. The method of claim 16, wherein the flexible material has a direct path between storage spool and the output spool.

18. The method of claim 16, wherein the flexible material has an indirect path between storage spool and the output spool.

19. The method of claim 18, wherein the indirect path is formed by one or more guides.

20. The method of claim 16, further comprising supporting the flexible material with one or more guides.

21. The method of claim 16, wherein the storage spool is spring loaded to wind the flexible material onto the storage spool.

22. The method of claim 16, wherein one or more latches prevent the flexible material from disengaging the storage spool or the output spool.

23. The method of claim 16, wherein the flexible material comprises a metal ribbon.

24. The method of claim 23, wherein the metal ribbon comprises a spring, the spring loaded to wind onto the storage spool.

25. The method of claim 16, wherein the flexible material comprises a wire.

26. The method of claim 16, further comprising a motor assembly for winding the flexible material between the storage spool and the output spool.

27. The method of claim 26, wherein the motor assembly comprises a stepper motor.

28. The method of claim 26, wherein the motor assembly comprises a gearhead assembly.

29. The method of claim 26, wherein the storage spool is spring loaded to wind the flexible material onto the storage spool and the motor assembly is alternately controlled to allow the flexible material to wind onto the storage spool and to overcome the spring loading and wind the flexible material onto the output spool.

30. The method of claim 29, wherein the flexible material comprises a spring that spring loads the storage spool.

* * * * *